April 18, 1944.  J. B. WHITTED  2,347,142
AUTOMATIC HEATER CONTROL VALVE
Filed Sept. 17, 1942   3 Sheets-Sheet 1

Inventor:
John B. Whitted
By Williams, Bradbury & Hinkle
Attys.

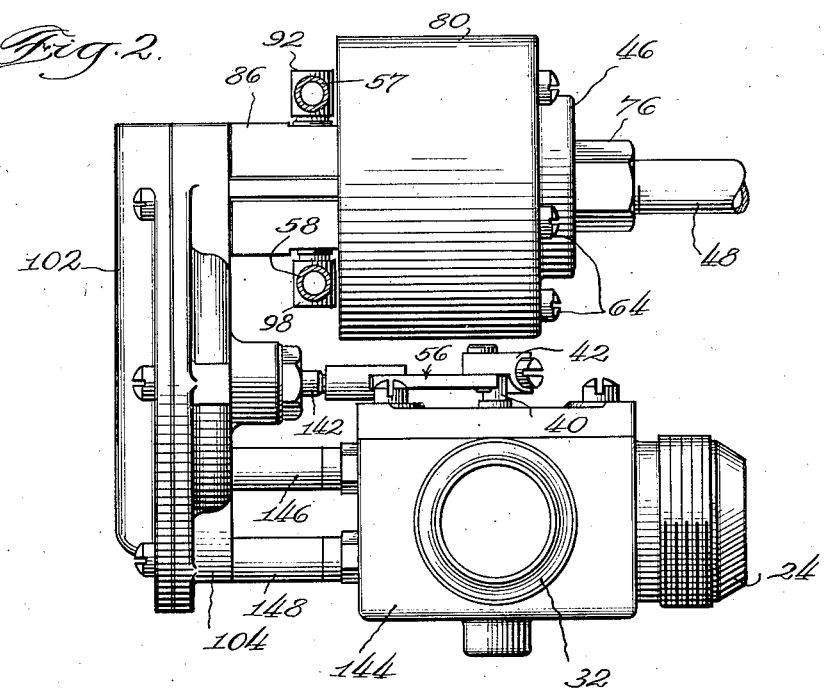
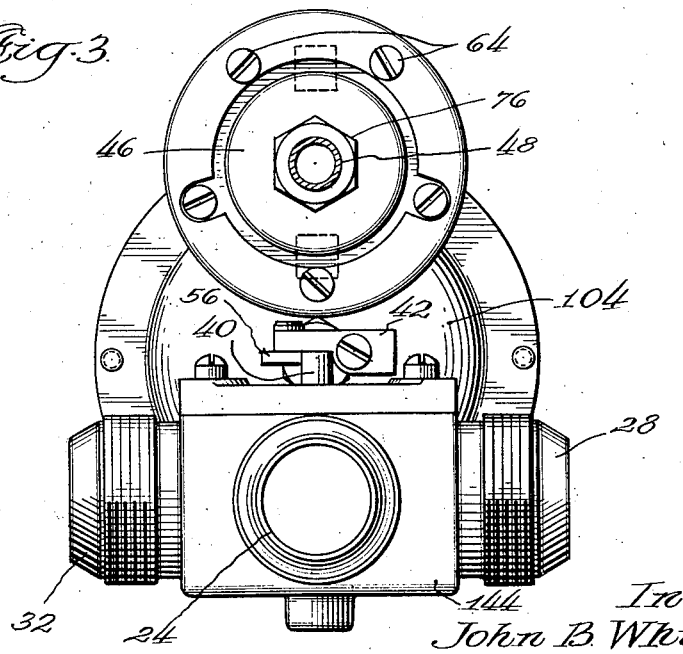

Patented Apr. 18, 1944

2,347,142

UNITED STATES PATENT OFFICE 2,347,142

AUTOMATIC HEATER CONTROL VALVE

John B. Whitted, Evanston, Ill., assignor to Stewart-Warner Corporation, Chicago, Ill., a corporation of Virginia Application September 17, 1942, Serial No. 458,637

6 Claims. (Cl. 237—12.3)

My invention pertains to automatic heater control valves and is more particularly concerned with the provision of a valve for controlling the exhaust from an internal combustion type of heater used on aircraft.

It has become common practice to utilize a portion of the fuel and air mixture supplied to the aircraft engine by its supercharger as a source of combustible mixture for the operation of one or more internal combustion type heaters for heating the cabin and other parts of the aircraft. The products of combustion from the heater have ordinarily been discharged overboard, but in some instances have been returned to the inlet of the supercharger. Under some conditions of operation of the aircraft, it is desirable to utilize differential pressure between the inlet and the outlet of the supercharger to cause flow of the combustible mixture to the heater and to cause the discharge of the products of combustion therefrom, while under other conditions of operation, the pressure differential between the pressure side of the supercharger and the atmosphere is sufficient for satisfactory operation of the heater.

Although under substantially all conditions of aircraft operation, the heater will operate satisfactorily when it is connected between the outlet and the inlet of the engine supercharger, there is some slight disadvantage in permanently connecting the heater in this manner. Even though the products of combustion entering the inlet of the supercharger from the heater form but a small percentage of the flow through the supercharger, and the dilution of the mixture supplied to the engine or engines therefore does not noticeably affect engine operation, such dilution may have some effect on engine operation or, over a long period of time, on the life of the supercharger and engine parts. It is, therefore advisable to avoid such admixture of the products of combustion from the heater with the charge flowing to the engine whenever this is possible.

It is, therefore, an object of my invention to provide improved means for automatically controlling the flow of exhaust gases from an internal combustion type heater, either to the atmosphere or to the inlet side of the engine supercharger, depending upon the conditions under which the aircraft is operating.

A further object of my invention is to provide an improved diverter valve having a more sensitive control means.

Other objects and advantages will appear from the following description, reference being had to the accompanying drawings, in which:

Fig. 2 is a plan view of my novel automatic control valve;

Fig. 3 is an end view of the control valve shown in Fig. 2; and

Figure 1:
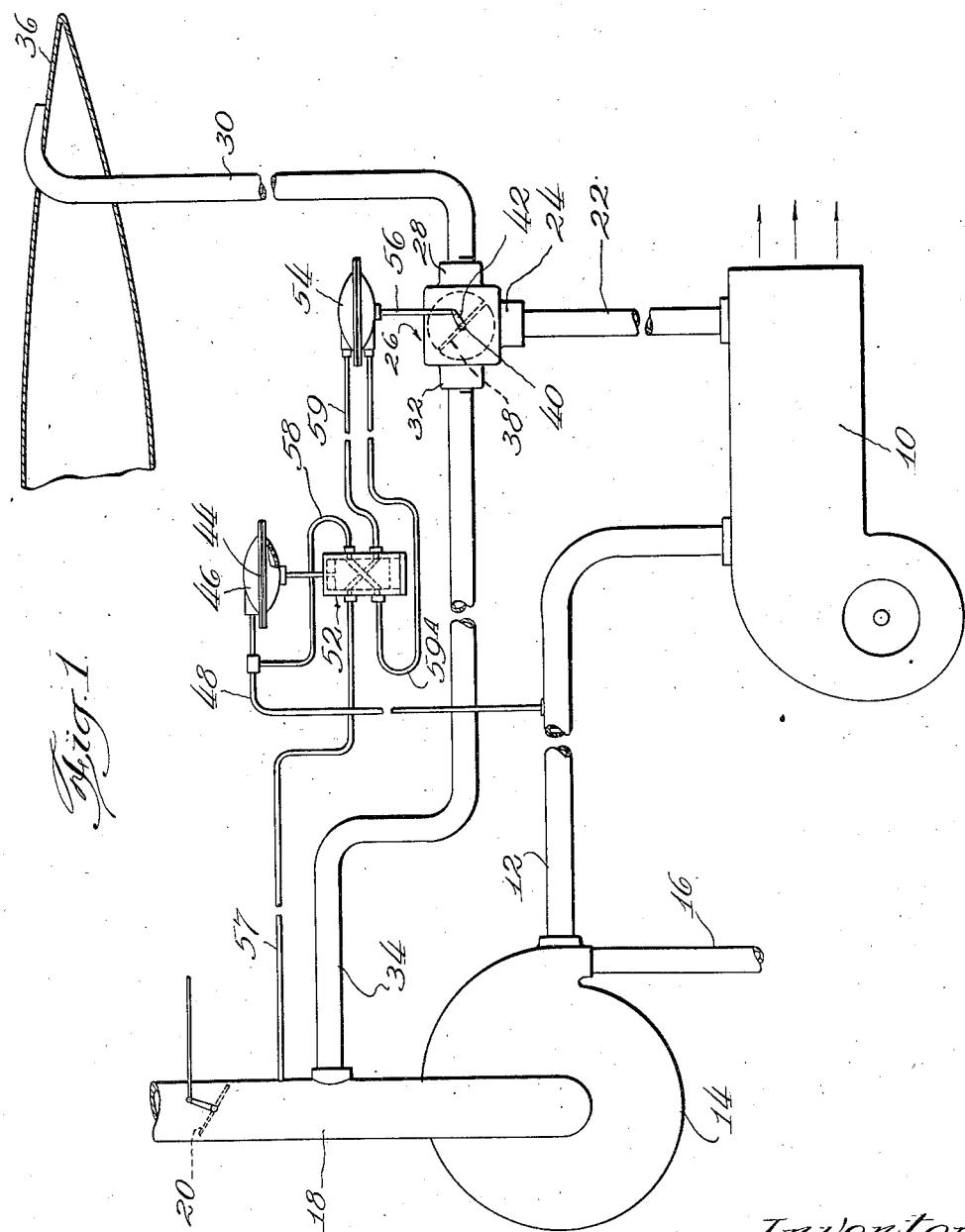
Fig. 1 is a diagrammatic view of a typical installation embodying my invention.

In Fig. 1, I have shown an aircraft heating system comprising an internal combustion type heater 10 which may be of any suitable construction, such, for example, as that shown in the copending application of H. J. DeN. McCollum, Serial No. 447,345, filed June 7, 1942.

This heater is illustrated as being supplied with a combustible mixture of fuel and air through a conduit 12 which receives the mixture from the pressure side of a supercharger 14 serving to supply a combustible mixture to an engine or engines through a conduit 16. The mixture is supplied to the supercharger 14 through an induction pipe 18 which may be controlled by a throttle valve 20.

The products of combustion are discharged from the heater 10 into an exhaust pipe 22 leading to the inlet 24 of my novel automatic control valve 26. This valve has an outlet 28, illustrated as being connected to atmosphere by a tail pipe 30 and a second outlet 32 connected to the supercharger induction pipe 18 by conduit 34. The tail pipe 30 is illustrated as projecting through the skin 36 of the aircraft so that operation of the aircraft creates a suction at the outlet end of the tail pipe 30, although this particular arrangement of the tail pipe is not essential to my invention and other arrangements of the tail pipe may be used in lieu thereof.

The control valve 26 is a three-way valve wherein communication between the inlet 24 and the outlet 28, or the outlet 32, is regulated by a valve disc 38 mounted on a shaft 40 and rotated by an arm 42 between the position shown in Fig. 1 wherein the inlet 24 is in connection with the outlet 28 and a second position which connects the inlet 24 with the outlet 32. The position of the valve disc 38 is controlled by the difference in pressure between the heater inlet pipe or manifold 12 and the atmosphere in such manner that when this pressure differential is sufficient to provide the necessary flow of combustible mixture into and through the heater 10, the products of combustion from the heater are discharged through the tail pipe 30, whereas when this differential pressure is insufficient for this purpose, the valve disc 38 is shifted from the position shown in Fig. 1 to a second position connecting the valve inlet 24 with the valve outlet 32 to cause the products of combustion from the heater to be discharged into the induction pipe 18 of the supercharger 14.

In general, the control means for the valve disc 38 comprises a control diaphragm 44 located in a primary control chamber 46 connected by pipe 48 to the heater manifold 12. That part of the chamber 46 on the other side of the diaphragm is open to atmosphere so that one side of the diaphgram 44 is exposed to the pressure at the heater inlet and the other side of this diaphragm is exposed to atmospheric pressure. Light springs tend to resist movement of the diaphragm 44 under the pressure created by the supercharger in the heater inlet conduit or manifold 12.

The control diaphragm regulates the position of a secondary control mechanism 52 regulating the admission of suction and pressure to opposite sides of a motor diaphragm 54. The motor diaphragm 54 is connected by linkage 56 to the arm 42 on valve disc shaft 40. The power for actuating the motor diaphragm 54 is derived from the supercharger 14. Conduits 57 and 58 connect the secondary control mechanism with opposite sides of the supercharger 14 and conduits 59 and 59A connect this mechanism with opposite sides of motor diaphragm.

Figure 4:
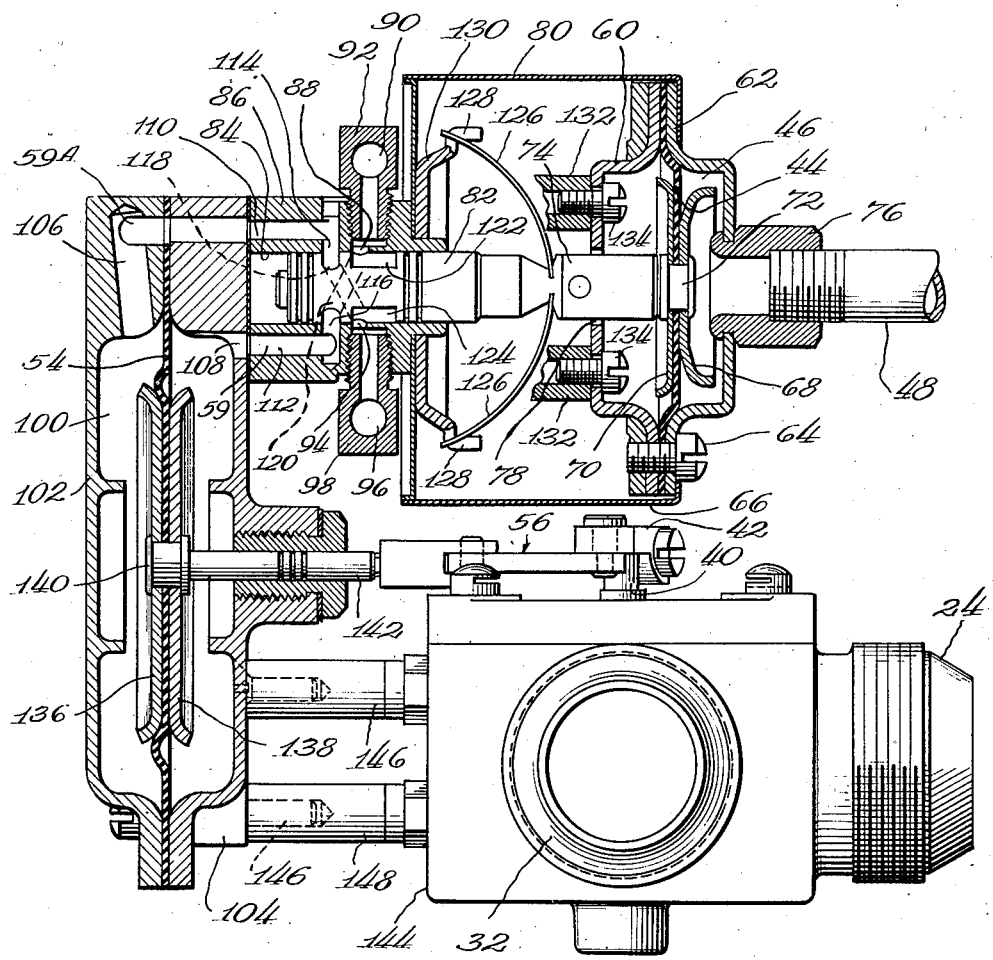
Fig. 4 is an enlarged view similar to Fig. 2 but showing parts in section to illustrate constructional features.

The structure of my novel automatic heater control valve is shown more clearly in Figs. 2, 3 and 4 and reference is made particularly to the latter figure for a disclosure of details of construction. In this Fig. 4, the control diaphragm 44 forms part of a primary control mechanism, including the diaphragm chamber 46 formed by stampings 60 and 62 which are clamped against opposite sides of the diaphragm 44 by studs 64 threaded into a clamping ring 66. The central portion of the diaphragm 44 is reinforced by metal plates 68 and 70 clamped to opposite sides of the diaphragm 44 by the riveted end 72 of a valve member 74, which is reciprocated by movement of the central portion of the diaphragm.

The stamping 62 is provided with a threaded fitting 76 to which is connected the pipe 48 leading to the heater intake conduit or manifold 12, so that the right hand side of the diaphragm 44, as viewed in Fig. 4, is exposed to the pressure created by the supercharger 14. The stamping 60 is provided with a central opening 78 in which the valve member 74 is located. This opening 78 provides free communication between the lefthand side of the diaphragm chamber and the interior of a housing 80, so that pressure on the lefthand side of the diaphragm varies with variations of the pressure in the housing 80. This housing is open to atmosphere, so that the control diaphragm 44 is subjected to the differential in pressure existing between the manifold 12 and atmosphere.

The valve member 74 has a cylindrical valve portion 82 which slides in the bore 84 of a casting 86 and this valve member and casting form parts of the secondary control mechanism 52 for reversing the direction of power application to the motor diaphragm 54. The casting 86 has a port 88 communicating with the passage 90 in a nipple 92 to which is connected the pipe 58 leading to the outlet side of the supercharger 14. The casting 86 has a second port 94 connected to the passage 96 in a nipple 98 to which is connected a pipe 57 leading to the induction side of the supercharger.

The valve member 82 is provided with alternate sets of passages for alternatively connecting these ports with opposite sides of the motor diaphragm 54 located in a diaphragm chamber 100 formed between castings 102 and 104 and provided with fluid passages 106 and 108. The passage 106 connects with a passage 110 in the casting 86 to form conduit 59A and the passage 108 communicates with a passage 112 in this casting to form conduit 59. The passages 110 and 112 have ports 114 and 116, respectively. When the valve member 74 is in the position shown, diagonal passage 118 connects ports 114 and 94 so that the lefthand side of motor diaphragm 54 is subjected to the suction at the intake side of the supercharger 14. At the same time, diagonal passage 120 connects ports 88 and 116 so that the righthand side of the motor diaphragm 54 is subjected to the pressure at the outlet side of the supercharger 14.

When the valve member 74 is shifted to the left by control diaphragm 44, longitudinal passage 122 connects ports 88 and 114 and longitudinal passage 124 connects ports 94 and 116 to reverse the application of atmospheric pressure and suction to the motor diaphragm 54. The valve member 74 is urged toward the right by springs 126 which rest upon the oppositely directed arms 128 of support 130. This support is press fitted onto the end of casting 86 and secures housing 80 thereto. This support is also provided with hollow posts 132 to which the stamping 60 is secured by screws 134.

The motor diaphragm 54 has reinforcing plates 136 and 138 on opposite sides of its central portion and secured to the diaphragm by the riveted end 140 of a piston rod 142 forming part of the linkage 56 for connecting the motor diaphragm 54 with the arm 42 attached to the shaft 40 of the valve disc 38. The casting 104 is mounted on the control valve housing 144 and is attached by studs 146 to supports 148 carried by the housing 144.

When the pressure differential between the combustible mixture supplied to the heater through conduit 12 and atmosphere is sufficiently great to overcome the resistance of springs 126, control diaphragm 44 and valve member 74 are moved to the left, as viewed in Fig. 4, whereupon passage 122 connects ports 88 and 114 and the lefthand side of the motor diaphragm 54 is exposed to the pressure created at the outlet side of the supercharger. At the sametime, passage 124 connects ports 94 and 116 so that the righthand side of the diaphragm 54 is exposed to the suction created at the intake side of the supercharger. The pressure differential between opposite sides of the motor diaphragm 54 then moves this diaphragm to the right, as viewed in Fig. 4, and shifts the valve disc 38 from the position shown in Fig. 1 to a position wherein the heater discharge pipe 22 is in communication with tail pipe 30.

The parts remain in this position as long as the pressure differential between heater supply pipe 12 and atmosphere is sufficient to overcome the force of springs 126. As soon as this pressure differential decreases to such an extent as to impair heater operation, springs 126 move control diaphragm 44 and valve member 74 to the right and return it to the position shown in Fig. 4. In this position the righthand side of motor diaphragm 54 is exposed to the super-atmospheric pressure created by the supercharger and the lefthand side of this diaphragm is exposed to the suction created by the supercharger. This causes the motor diaphragm 54 to move to the left, as viewed in Fig. 4, and to shift valve disc 38 to the position shown in Fig. 1 so that the products of combustion discharged from the heater 10 flow from discharge pipe 28 into pipe 34 leading to the intake side of the supercharger 14.

An important feature of my invention lies in the arrangement of the springs 126 so that the valve member is operated with a snap action in both directions and can not stop in mid-position. The springs 126 are bowed to such an extent that they exert the greatest force on the valve member 74 when the springs are in the expanded position shown in Fig. 4. As the pressure in the heater manifold 12 increases, it approaches the predetermined operating pressure, such, for example, as two pounds above atmospheric pressure. When this predetermined pressure is reached in the heater manifold 12 and that portion of the diaphragm chamber 46 which is to the right of the diaphragm 44, the resistance of springs 126 is overcome and valve member 74 moves toward the left. This movement increases the curvature of springs 126 and reduces their resistance to movement of the valve member 74 and this decreasing resistance of the springs 126 continues as the valve member moves toward its full lefthand position. The force necessary to create the initial lefthand movement of the valve member 74 is, therefore, more than sufficient to complete this movement and the movement once initiated is always completed.

If we assume that a pressure of two pounds above atmosphere on the righthand side of diaphragm 44 was sufficient to initiate lefthand movement of valve member 74, a lesser pressure, such as 1⅞ pounds above atmospheric pressure, on the righthand side of the diaphragm 44 will be sufficient to retain valve member 74 in its lefthand position. The initiating pressure would ordinarily be less than the pressure in the heater manifold 12 under normal operating conditions, so that after the valve member 74 had been moved to the left (Fig. 4) to connect the heater exhaust with the tail pipe 30, the pressure in the heater manifold 12 would increase, but such increase would have no affect on the primary control. If the pressure in the heater manifold 12 dropped below 1⅞ pounds above atmospheric pressure, springs 126 would move valve member 74 to the right, as viewed in Fig. 4. The force exerted by the springs 126 on the valve member 74 would increase continuously as the valve member moved to the right, with the result that the valve member 74 would be snapped back to the position shown in Fig. 4 and the motor diaphragm 54 would be actuated to shift the valve disc 38 to connect the heater exhaust with the induction pipe of the supercharger 14.

It will be noted that the primary control consisting of the control diaphragm 44 and its associated parts is entirely separate and distinct from the motor mechanism for shifting the valve disc 38. The primary control, therefore, can be made of any suitable size and the springs 126 given any desired tension to enable the primary control to function properly under any predetermined pressure differential. The motor mechanism for shifting the valve disc 38 may also be made of any size so that it will produce any desired force under any given pressure differential. The primary control functions only to shift a cylindrical valve part which is inherently balanced and requires a minimum of force so that this primary control may be made extremely sensitive, and while I have described my novel control valve as being utilized for a particular purpose, it is capable of other uses and is not to be considered as limited to the particular use described herein.

While this application illustrates and describes only a single embodiment of my invention, my invention is not limited to this particular embodiment shown but may assume numerous forms and is to be construed as including all modifications and variations falling within the scope of the appended claims.

I claim:

1. A heater control valve for an aircraft heater of the internal combustion type supplied with combustible mixture from a supercharger and adapted to exhaust alternatively through a tail pipe or through a pipe leading to the intake of the supercharger, said valve comprising a valve disc for controlling communication between said heater and said alternative pipes, a primary control operative in response to differences in pressure between the fuel inlet for said heater and atmosphere, fluid motor mechanism for shifting said valve disc, said motor mechanism including a diaphragm operated by fluid pressure across said supercharger and means responsive to said primary control for actuating said motor mechanism and valve disc in opposite directions.

2. A heater control valve for an aircraft heater of the internal combustion type supplied with combustible mixture from a supercharger and adapted to exhaust either through a tail pipe or through a pipe leading to the intake of the supercharger, said valve comprising a valve disc for controlling communication between said heater and said pipes, a primary control operative in response to differences in pressure between the fuel inlet for said heater and atmosphere, double acting fluid motor mechanism of the variable chamber type for shifting said valve disc, and valve means responsive to said primary control for actuating said motor mechanism in opposite directions.

3. A heater control valve for an aircraft heater of the internal combustion type supplied with combustible mixture from a supercharger and adapted to exhaust either through a tail pipe or through a pipe leading to the intake of the supercharger, said valve comprising a valve member for selectively controlling communication between said heater and said pipes, primary control means operative in response to differences in pressure between the fuel inlet for said heater and atmosphere, a fluid motor operative by the pressure difference across said supercharger for shifting said valve disc, and a secondary control mechanism responsive to said primary control means for actuating said motor in opposite directions.

4. A heater control valve for a heater of the internal combustion type supplied with combustible mixture from a supercharger and adapted to exhaust alternatively through a tail pipe or through a pipe leading to the intake of the supercharger, said valve comprising a valve disc for controlling communication between said heater and said alternative pipes, a control diaphragm operative in response to differences in pressure between the fuel inlet for said heater and atmosphere, a motor diaphragm for shifting said valve disc, and means responsive to said primary control for actuating said motor diaphragm in opposite directions.

5. A heater control valve for a heater of the internal combustion type supplied with combustible mixture from a supercharger and adapted to exhaust alternatively through a tail pipe or through a pipe leading to the intake of the supercharger, said valve comprising a valve member for controlling communication between said heater and said alternative pipes, a motor for shifting said valve member, means connecting said motor to said supercharger for actuation thereby, and automatic control means responsive to pressure differences between the heater inlet and atmosphere for shifting said connecting means.

6. A heater control valve for a heater of the internal combustion type supplied with combustible mixture from a supercharger and adapted to exhaust alternatively through a tail pipe or through a pipe leading to the intake of the supercharger, said valve comprising a valve member for controlling communication between said alternative pipes, a motor for shifting said valve member, snap action means for reversing power connections to said motor, and a control for said last-named means responsive to pressure differences between the heater inlet and atmosphere.

JOHN B. WHITTED.